US008440359B2

(12) United States Patent
Robb et al.

(10) Patent No.: US 8,440,359 B2

(45) Date of Patent: May 14, 2013

(54) COMPRESSION FILL OF ANODE OF A FUEL CELL SYSTEM

(75) Inventors: Gary M. Robb, Honeoye Falls, NY (US); Steven G. Goebel, Victor, NY (US); Daniel I. Harris, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 12/752,356

(22) Filed: Apr. 1, 2010

(65) Prior Publication Data

US 2011/0244347 A1 Oct. 6, 2011

(51) Int. Cl.
*H01M 8/04* (2006.01)

(52) U.S. Cl.
USPC ........... 429/429; 429/408; 429/415; 429/428; 429/432; 429/443; 429/444

(58) Field of Classification Search ........................ None
See application file for complete search history.

(56) References Cited

U.S. PATENT DOCUMENTS

| | | | | |
|---|---|---|---|---|
| 6,924,056 | B2 | 8/2005 | Whiton et al. | |
| 8,097,375 | B2 * | 1/2012 | Robb et al. | 429/443 |
| 2005/0118487 | A1 | 6/2005 | Whiton et al. | |
| 2005/0129999 | A1 | 6/2005 | Geschwindt et al. | |
| 2009/0104480 | A1 * | 4/2009 | Machuca et al. | 429/17 |
| 2009/0181268 | A1 * | 7/2009 | Robb et al. | 429/13 |

* cited by examiner

*Primary Examiner* — Cynthia Walls
(74) *Attorney, Agent, or Firm* — Fraser Clemens Martin & Miller LLC; J. Douglas Miller

(57) ABSTRACT

A method for filling a fuel cell system with a fuel during start-up is disclosed, the method including the steps of providing a fuel cell stack having a plurality of fuels cells, each fuel cell having an active area, the fuel cell stack including an anode supply manifold and an anode exhaust manifold, the anode supply manifold and in fluid communication with a source of fuel; providing an anode sub-system in fluid communication with an anode side of the fuel cell stack; and supplying the fuel to the fuel cell stack substantially uniformly and substantially simultaneously to compress any fluids in the fuel cell stack into a volume between an end of each active area adjacent to the anode exhaust manifold and an outlet of the anode sub-system.

15 Claims, 6 Drawing Sheets

COMPRESSION FILL OF ANODE OF A FUEL CELL SYSTEM

FIELD OF THE INVENTION

This invention relates to a method of operation for a fuel cell system. More particularly, the invention is directed to a method for filling an anode side of a fuel cell system with hydrogen prior to or during a start-up operation of the fuel cell system to minimize hydrogen emissions.

BACKGROUND OF THE INVENTION

Fuel cell systems use a fuel and an oxidant to react to produce electricity in a fuel cell stack. One type of fuel cell system employs a proton exchange membrane (hereinafter "PEM"). The PEM is a solid polymer electrolyte membrane that facilitates transfer of protons from an anode to a cathode in each individual fuel cell normally deployed in a fuel cell system. The electrodes and membrane together form a membrane electrode assembly (MEA). The electrodes contain catalysts to catalytically facilitate reaction of the fuel (such as hydrogen) and the oxidant (such as oxygen or air) to generate the electricity.

In a typical PEM fuel cell, the MEA is disposed between gas diffusion media (GDM). The GDM and MEA are disposed between a pair of electrically conductive plates. If the plates are bipolar plates, the plates conduct current between adjacent fuel cells in the fuel cell system. If the plates are unipolar plates at an end of the fuel cell system, the plates conduct current externally of the fuel cells.

As described in commonly-owned, co-pending U.S. patent application Ser. No. 11/762,845, hereby incorporated herein by reference in its entirety, the goal of an anode supply manifold purge operation is to completely fill the anode supply manifold with hydrogen. The anode supply manifold is filled with hydrogen prior to filling active areas of the anode with hydrogen during startup. Generally, the anode supply manifold is filled with hydrogen by opening a manifold purge valve at the top of the anode supply manifold while producing a flow of hydrogen into the bottom of the anode supply manifold. Purge valves may allow emission of the hydrogen flowing therethrough to the atmosphere, thereby increasing a cost to operate and an amount of time to startup, the fuel cell system.

A flow rate of hydrogen, along with a flow resistance of the purge valve, creates a back pressure in the anode supply. Hydrogen is then caused to uniformly flow through the active area. During this time, electrode to electrolyte potential differences on the cathode in the air/air part of the cell can be quite high (higher than the measured cell voltage) as driven by the hydrogen/air part of the cell. Stack loads can be used to suppress the cell voltages. To limit the cumulative effect of these events where hydrogen fills the anode of an air filled stack, it is desired to quickly fill the anode. The gas resident within the anode is discharged from the system through a discharge valve to the exhaust. However, the anode flush rate of air is limited by the pressure limit of the anode and the size of this discharge valve. This discharge valve must be closed before hydrogen is discharged to avoid hydrogen emissions concerns or the rate of discharge must be further reduced such that dilution air in the exhaust can bring any discharged hydrogen to an acceptable mole fraction.

It would be desirable to develop a method for filling an active area of an anode side of each fuel cell of a fuel cell system with hydrogen prior to a start-up operation, wherein the anode is quickly filled with hydrogen and discharge of hydrogen from the system is militated against.

SUMMARY OF THE INVENTION

Concordant and congruous with the present invention, a method for quickly filling an active area of an anode side of a fuel cell system with hydrogen prior to a start-up operation, and discharge of hydrogen from the system is militated against, has surprisingly been discovered.

In one embodiment, a method for filling a fuel cell system with a fuel during start-up, the method comprises the steps of providing a fuel cell stack having a plurality of fuels cells, each fuel cell having an active area, the fuel cell stack including an anode supply manifold and an anode exhaust manifold, the anode supply manifold in fluid communication with a source of fuel; providing an anode sub-system in fluid communication with an anode side of the fuel cell stack; and supplying the fuel to the fuel cell stack substantially uniformly and substantially simultaneously to compress any fluids in the fuel cell stack into a volume between an end of each active area adjacent to the anode exhaust manifold and an outlet of the anode sub-system.

In another embodiment, a method for filling a fuel cell system with a fuel during start-up, the method comprises the steps of providing a fuel cell stack having a plurality of fuels cells, each fuel cell having an active area, the fuel cell stack including an anode supply manifold and an anode exhaust manifold, the anode supply manifold in fluid communication with a source of fuel; providing a sub-system in fluid communication with an anode side of the fuel cell stack; determining the volume between the end of each active area adjacent to the anode exhaust manifold and an outlet of the anode sub-system; and supplying the fuel to the fuel cell stack substantially uniformly and substantially simultaneously to compress any fluids in the fuel cell stack into a volume between an end of each active area adjacent to the anode exhaust manifold and an outlet of the anode sub-system.

In another embodiment, a method for filling a fuel cell system with a fuel during start-up, the method comprises the steps of providing a fuel cell stack having a plurality of fuels cells, each fuel cell having an active area, the fuel cell stack including an anode supply manifold and an anode exhaust manifold, the anode supply manifold in fluid communication with a source of fuel; providing a sub-system in fluid communication with an anode side of the fuel cell stack; determining the volume between the end of each active area adjacent to the anode exhaust manifold and an outlet of the anode sub-system; and supplying the fuel to the fuel cell stack substantially uniformly and substantially simultaneously to compress any fluids in the fuel cell stack into a volume between an end of each active area adjacent to the anode exhaust manifold and an outlet of the anode sub-system.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE EMBODIMENTS OF THE INVENTION

Figure 1:
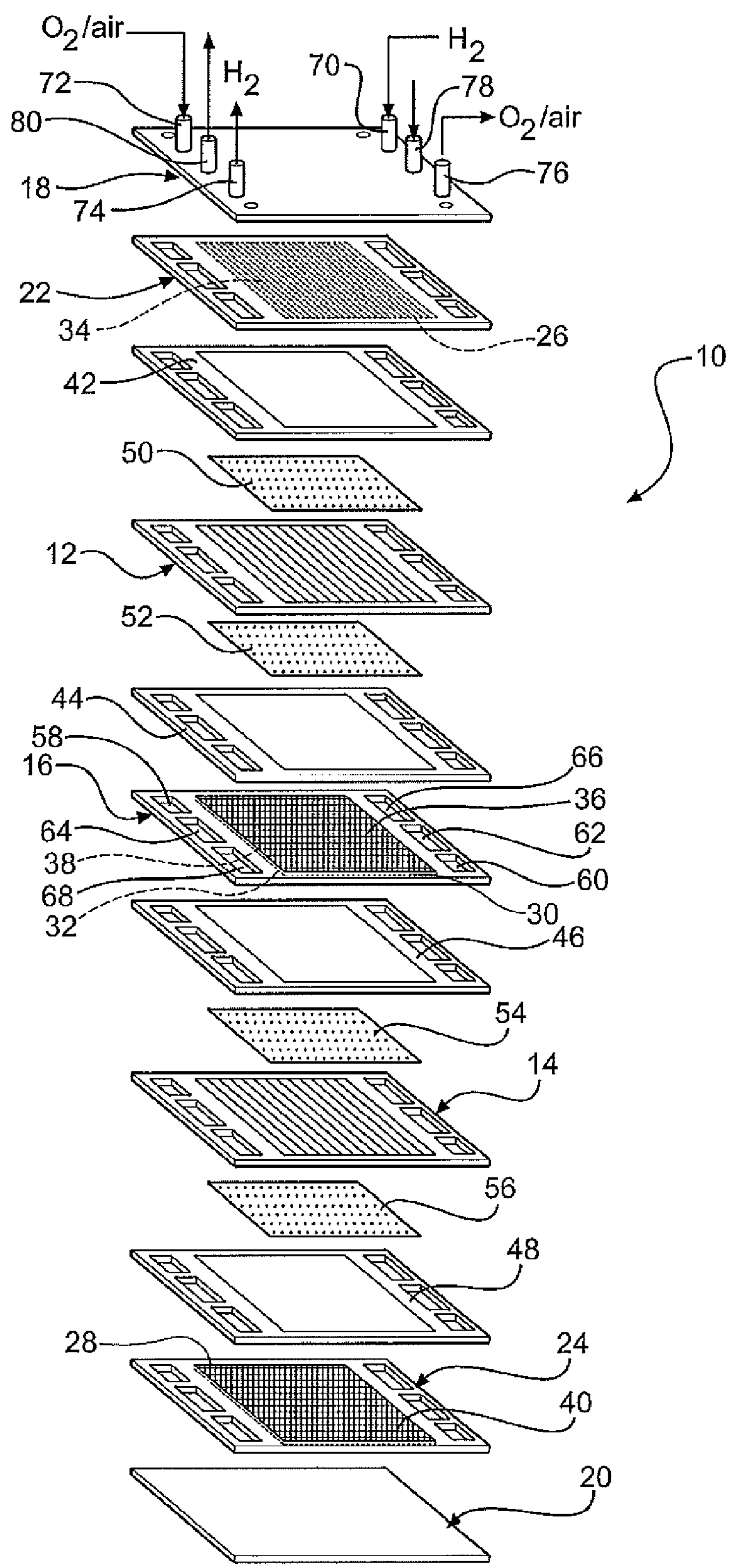
FIG. 1 is a schematic exploded perspective view of a PEM fuel cell stack as is known in the art.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 illustrates a PEM fuel cell stack 10 according to the prior art. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). A working face 26, 28 of each of the unipolar end plates 22, 24, as well as the working faces 30, 32 of the bipolar plate 16, include a plurality of grooves or channels 34, 36, 38, 40 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent to the diffusion media 52 on the anode face of the MEA 12. The bipolar plate 16 is further disposed adjacent the diffusion media 54 on the cathode face of the MEA 14.

The fuel cell stack 10 further includes a cathode supply manifold 58 and a cathode exhaust manifold 60, a coolant supply manifold 62, a coolant exhaust manifold 64, an anode supply manifold 66, and an anode exhaust manifold 68. The supply manifolds 58, 62, 66 and the exhaust manifolds 60, 64, 68 are formed by alignment of adjacent apertures formed in the bipolar plate 16, apertures formed in the gaskets 42, 44, 46, 48, and apertures formed in the end plates 22, 24. A hydrogen gas is supplied to the fuel cell stack 10 through the anode supply manifold 66 via an anode inlet conduit 70. An oxidant gas is supplied to the fuel cell stack 10 through the cathode supply manifold 58 of the fuel cell stack 10 via a cathode inlet conduit 72. An anode outlet conduit 74 and a cathode outlet conduit 76 are provided for the anode exhaust manifold 68 and the cathode exhaust manifold 60, respectively. A coolant inlet conduit 78 and a coolant outlet conduit 80 are in fluid communication with the coolant supply manifold 62 and the coolant exhaust manifold 64 to provide a flow of a liquid coolant there through. It is understood that the configurations of the various inlets 70, 72, 78 and outlets 74, 76, 80 in FIG. 1 are for the purpose of illustration, and other configurations may be chosen as desired.

Figure 2:
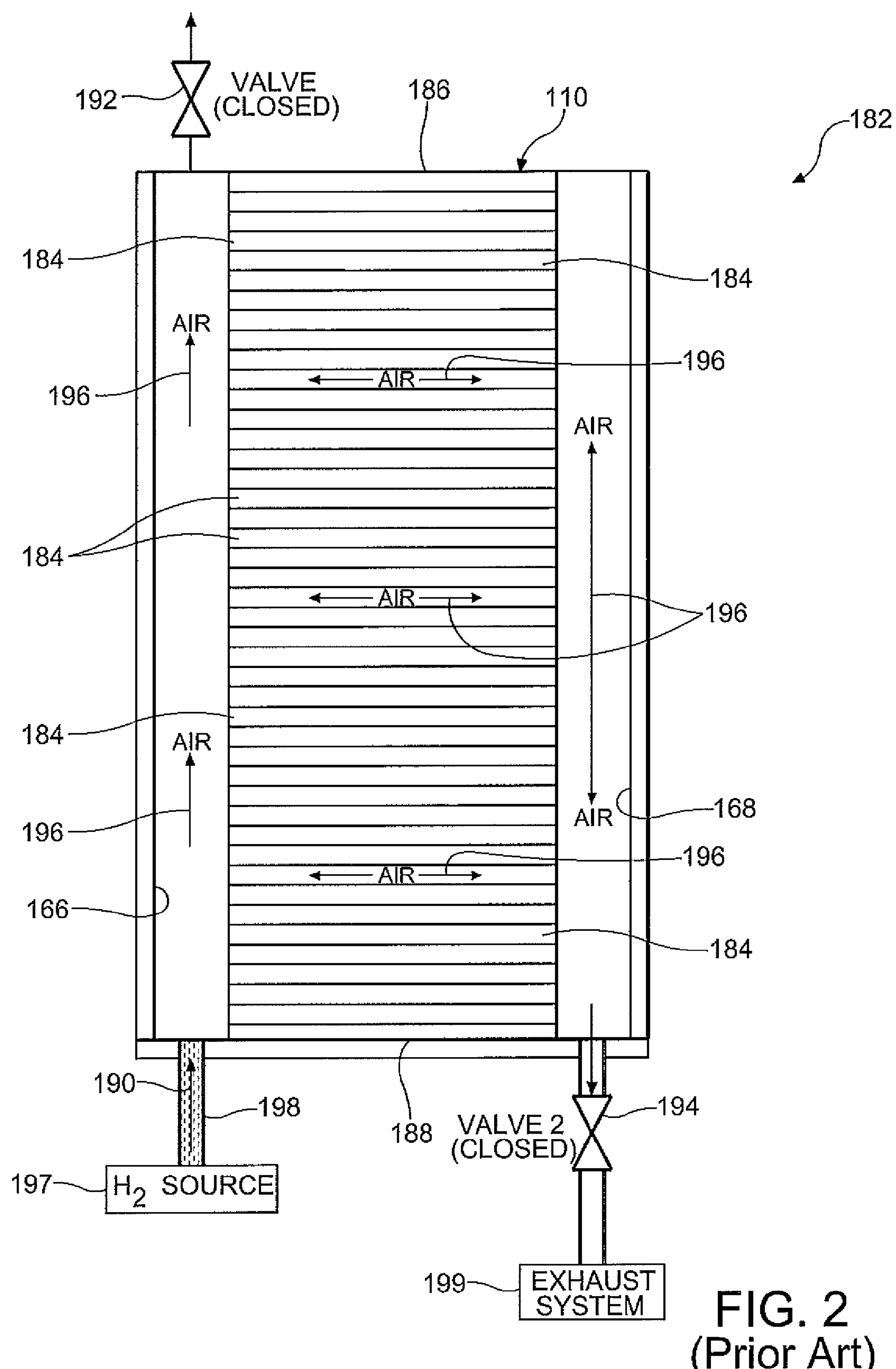
FIG. 2 is a schematic cross-sectional elevational view of a fuel cell system during a filling operation of an anode supply manifold of the fuel cell stack as is known in the art.
Figure 3:
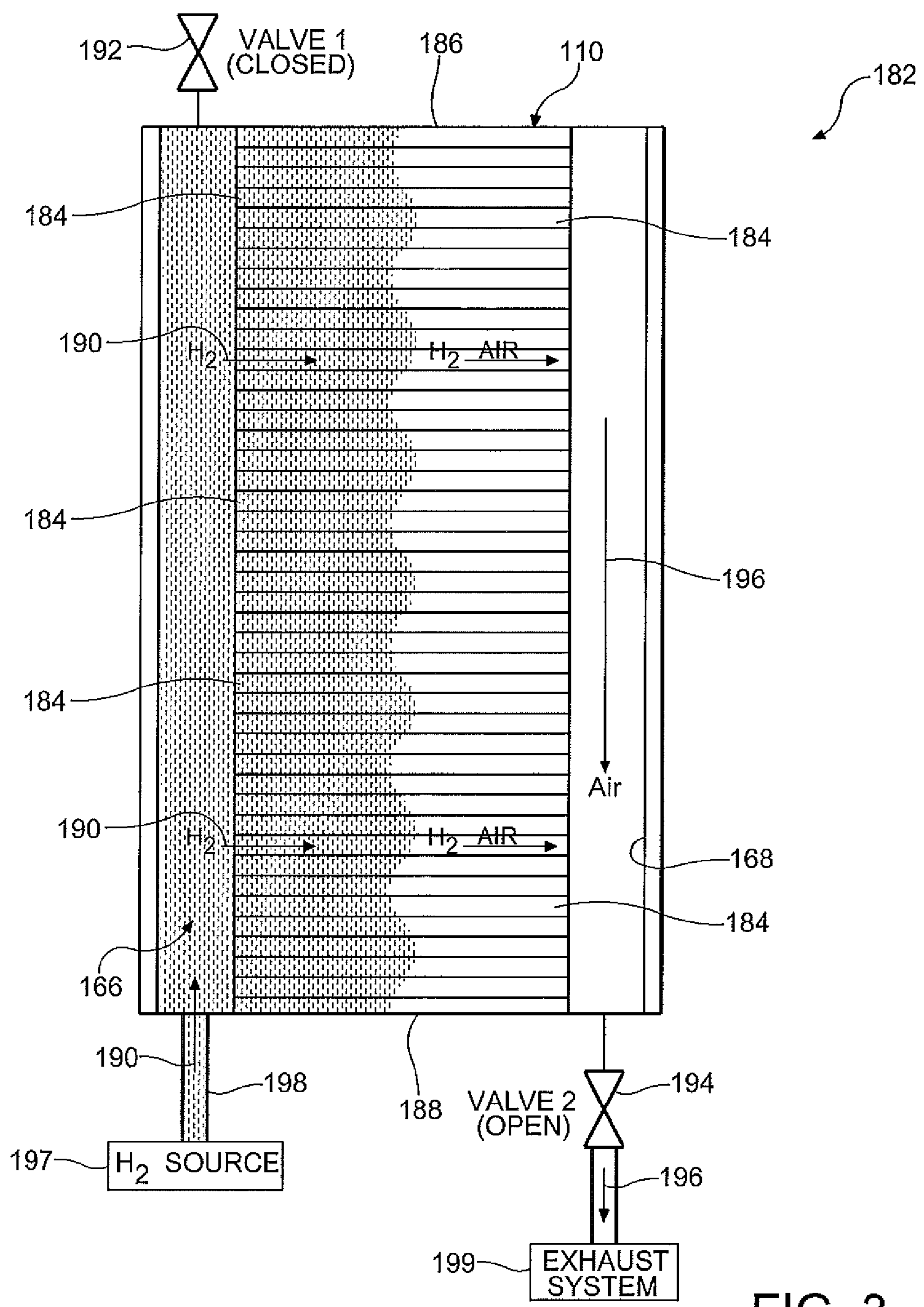
FIG. 3 is a schematic cross-sectional elevational view of the fuel cell stack of FIG. 2 after the anode supply manifold filling operation.

FIGS. 2 and 3 illustrate a fuel cell system 182 according to the prior art, such as the system illustrated in commonly-owned, co-pending U.S. patent application Ser. No. 12/014,326 for PROCEDURE FOR FILLING A FUEL CELL ANODE SUPPLY MANIFOLD WITH HYDROGEN FOR START-UP hereby incorporated herein by reference in its entirety. The fuel cell system 182 includes a fuel cell stack 110 having a plurality of fuel cells 184. Each of the fuel cells 184 has an anode (not shown) and a cathode (not shown) with an electrolyte membrane (not shown) disposed therebetween. The fuel cell stack 110 further includes a first end 186 and a second end 188. As described herein, the first end 186 is known as the "dry end" and the second end 188 is known as the "wet end."

An anode supply manifold 166 is in communication with the anodes of the fuel cells 184 and provides fluid communication between a source of fuel or hydrogen 197 and the fuel cells 184. The anode supply manifold 166 is adapted to receive a flow of gaseous hydrogen 190 through an anode inlet conduit 198 from the source of hydrogen 197. The anode inlet conduit 198 defines a volume between the source of hydrogen 197 and the anode supply manifold 166. It is understood that the anode inlet conduit 198 may have any desired cross-sectional area and may further include a chamber, for example. An anode exhaust manifold 168 of the fuel cell system 182 provides fluid communication between the anodes of the plurality of fuel cells 184 and an exhaust system 199. The anode exhaust manifold 168 is adapted to receive the fluid flowing through the anodes of the fuel cells 184. The fluid caused to flow through the anodes may be gaseous hydrogen, air, or water.

As illustrated, the fuel cell system 182 includes a first valve 192, also known as a purge valve, in fluid communication with the anode supply manifold 166. The first valve is disposed at the first end 186 of the fuel cell stack 110, spaced from the anode inlet conduit 198. A second valve 194 is in fluid communication with the anode exhaust manifold 168 and is disposed at the second end 188 of the fuel cell stack 110. The first valve 192 is adapted to facilitate purging of a fluid from the anode supply manifold 166. The second valve 194 is adapted to facilitate purging of a fluid from the fuel cells 184 and the anode exhaust manifold 168. It is understood that the second valve 194 may be disposed at the first end 186 of the fuel cell stack 110, if desired. The fuel cells 184 of the fuel cell system 182 are substantially evenly filled with the gaseous hydrogen 190 by the systematic opening and closing of the valves 192, 194 which causes pressure differentials in the fuel cell system 182. Depending on the various combinations of opened/closed configurations of the valves 192, 194, an inflow of the hydrogen 190 may cause a fluid pressure increase within the anode supply manifold 166 of the fuel cell stack 110, or the configuration of the valves 192, 194 may cause a decrease in the fluid pressure to cause substantially uniform flow of the hydrogen 190 through the fuel cell stack 110, thereby causing hydrogen to flow through the active areas of the anode portions of each of the fuel cells 184. For example, once a desired pressure in the fuel cell stack 110 is reached, the first valve 192 may be opened and the gaseous hydrogen 190 caused to flows into and through the anode supply manifold 166. If the active areas of the fuel cells 184 in the fuels cell stack 110 are pressurized, the gaseous hydrogen 190 is caused to flow through the anode supply manifold 166 and to the first valve 192, but is not permitted to flow into the active areas of the fuel cells 184.

As illustrated in FIG. 3, hydrogen is caused to flow through the active area of each fuel cell 184 at substantially the same flow rate, resulting in an even reactant distribution throughout the fuel cell stack 110 prior to a start-up operation. An even reactant distribution results in a substantially uniform voltage between individual fuel cells 184 of the fuel cell stack 110 and militates against carbon corrosion caused by hydrogen deficits in the fuel cells 184, for example, when current is drawn from the fuel cell stack 110. As hydrogen flows through the active areas of the fuel cells 184, air 196 is purged from the fuel cells 184 and the anode exhaust manifold 168, through the second valve 194, and to the exhaust system 199. It is understood that the flow rate of hydrogen through the active areas of the fuel cells 184 may be maximized in order to minimize the time any hydrogen-air fronts are present in the active area of the fuel cell stack 110. However, the prior art systems are limited by the size of the second valve 194, and hydrogen emissions when the hydrogen reaches this valve. Also, it is not known at the time of startup whether the stack contains air or hydrogen, such as from a short off-time, for example. To properly execute an anode flush with systems known in the art, the stack 110 gas content needs to be determined prior to a start-up operation to ensure a rapid flush of air in the stack 110 and/or to militate against emissions containing hydrogen.

Figure 4:
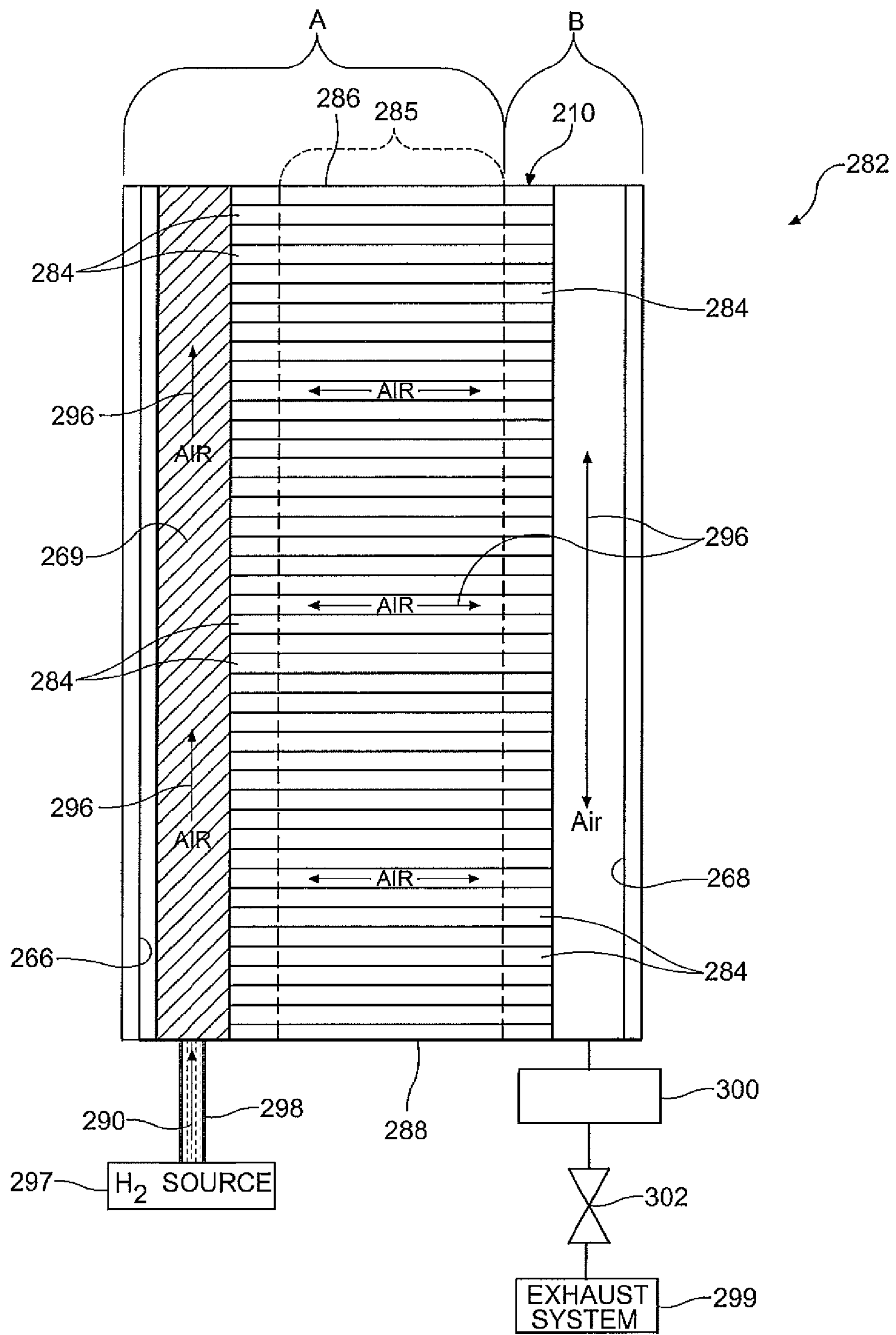
FIG. 4 is a schematic cross-sectional elevational view of a fuel cell stack during a filling operation of an anode supply manifold of the fuel cell stack according to an embodiment of the present invention.
Figure 5:
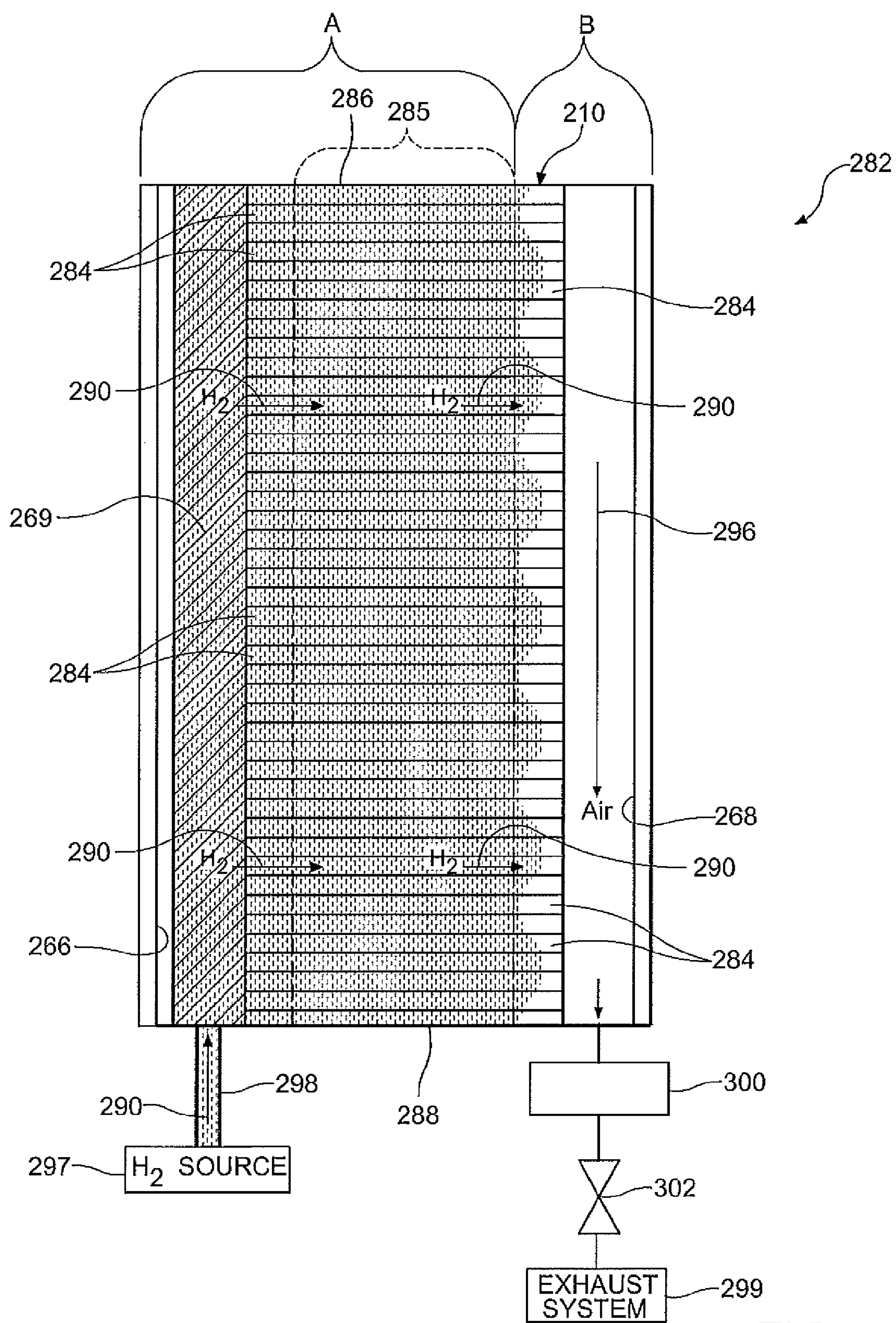
FIG. 5 is a schematic cross-sectional elevational view of the fuel cell stack of FIG. 4 after the anode supply manifold filling operation.

FIGS. 4 and 5 show a fuel cell system 282 according to an embodiment of the invention. The fuel cell system 282 includes a fuel cell stack 210 having a plurality of fuel cells 284. Each of the fuel cells 284 has an anode (not shown) and a cathode (not shown) with an electrolyte membrane (not shown) disposed therebetween. The fuel cell stack 210 further includes a first end 286 and a second end 288. As described herein, the first end 286 is known as the "dry end" and the second end 288 is known as the "wet end."

Figure 6:
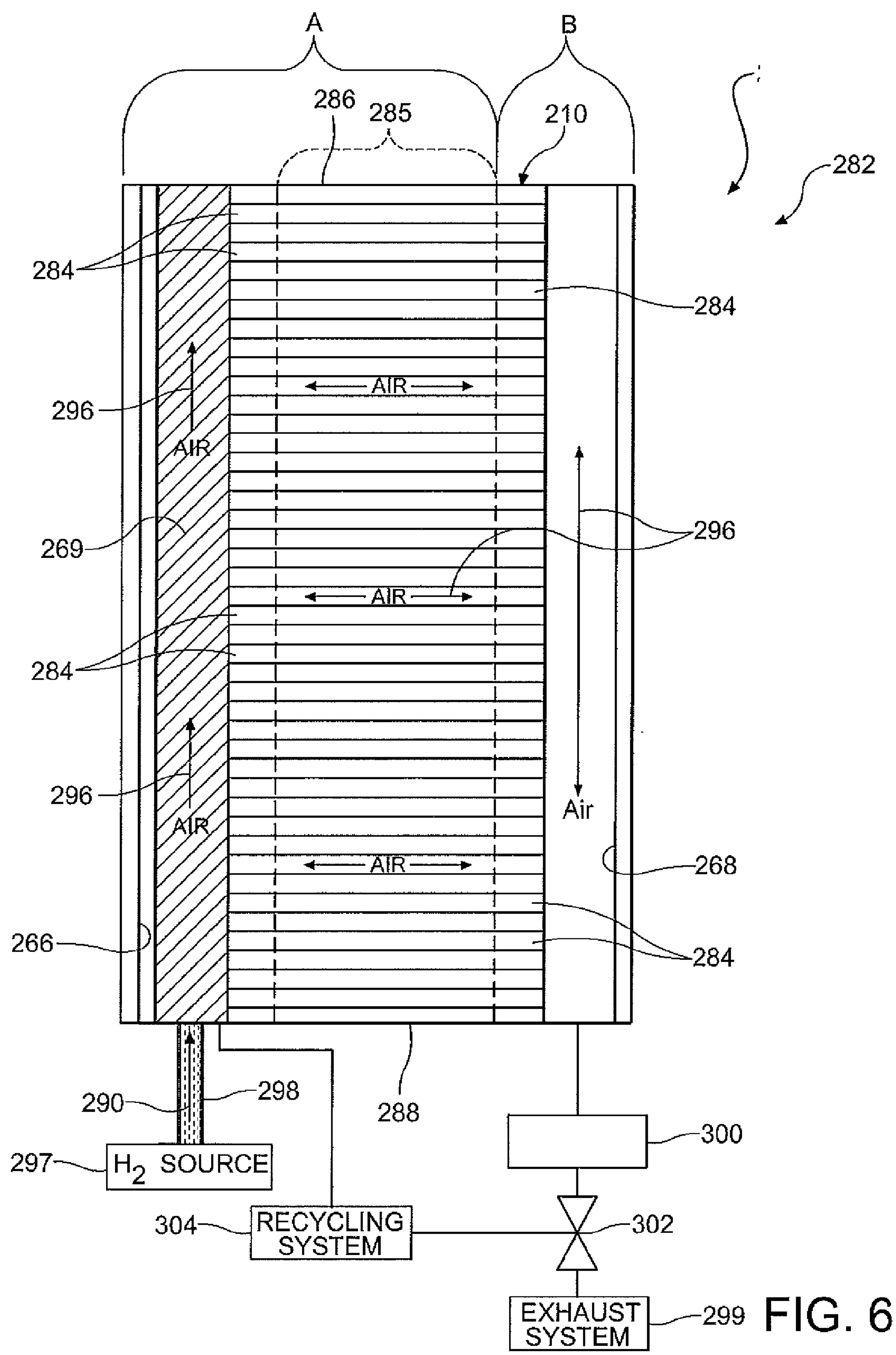
FIG. 6 is a schematic cross-sectional elevational view of a fuel cell stack during a filling operation of an anode supply manifold of the fuel cell stack according to another embodiment of the present invention.

An anode supply manifold 266 includes a means for distributing flow 269 in communication with the anodes of the fuel cells 284 and provides fluid communication between a source of fuel or hydrogen 297 and the fuel cells 284. It is understood that the anode supply manifold 266 may not include a means for distributing flow 269 if the manifold 266 has been purged prior to a flush of the anode side of the stack 210. The anode supply manifold 266 is adapted to receive a flow of gaseous hydrogen 290 through an anode inlet conduit 298 from the source of hydrogen 297. The anode inlet conduit 298 defines a volume between the source of hydrogen 297 and the anode supply manifold 266. It is understood that the anode inlet conduit 298 may have any desired cross-sectional area and may further include an additional volume such as a chamber, for example. An anode exhaust manifold 268 of the fuel cell system 282 provides fluid communication between the anodes of the plurality of fuel cells 284 and an anode subsystem 300. The downstream anode sub-system 300 provides a volume substantially equal to the anode volume within the fuel cell 284, or the volume may be from about 0.5× to about 1.5× the volume of the anode side of the fuel cell stack 210. As shown in FIG. 6, the anode sub-system 300 may be in fluid communication with a recycling system 304 in fluid communication with the anode supply manifold 266. The fuel cell system 282 may include an anode discharge valve 302 disposed between the anode sub-system 300 and the exhaust system 299, as shown in FIGS. 4 and 5, or the anode discharge valve 302 may be disposed between the anode sub-system 302 and the exhaust system 299, as shown in FIG. 6, as desired. The anode exhaust manifold 268 is adapted to receive the fluid flowing through the anodes of the fuel cells 284. The fluid caused to flow through the anodes may be gaseous hydrogen, air, or water.

The means for distributing flow 269 is adapted to provide gaseous hydrogen 290 substantially simultaneously and uniformly to the anode side of each fuel cell 284 at a substantially even rate or in a substantially even amount. The means for distributing flow 269 may be any suitable device or insert adapted to provide gaseous hydrogen 290 substantially simultaneously and uniformly to the anode side of each fuel cell 284 at a substantially even rate or in a substantially even amount, or the method of the prior art using a header purge valve. An example of a means for distributing flow 269 is a device disclosed in commonly-owned U.S. patent application Ser. No. 12/725,697 hereby incorporated herein by reference in its entirety. The means disclosed in the '697 application includes substantially uniform flow paths adapted to provide gaseous hydrogen substantially simultaneously to the anode side of each fuel cell of a fuel cell stack at a substantially even rate or in a substantially even amount. Another example of a means for distributing flow 269 is a device disclosed in commonly-owned U.S. patent application Ser. No. 12/720,748 hereby incorporated herein by reference in its entirety. The means disclosed in the '748 application includes tapers and baffles adapted to provide a substantially uniform volume of flow of gaseous hydrogen substantially simultaneously and uniformly to the anode side of each fuel cell of a fuel cell stack at a substantially even rate or in a substantially even amount.

Prior to a filling operation of the fuel cell stack 210, each of the following is determined: a volume A between the source of hydrogen 297 and the end of an active area 285 of the anode side of each fuel cell 284 adjacent to the anode exhaust manifold 268. Using the prior art method of header purge, this would include the active area 285 of each fuel cell 284 and a portion of each fuel cell 284 between the anode inlet manifold 266 and the active area 285, with a header insert device, this area includes the anode inlet conduit 298, the anode inlet manifold 266, a portion of each fuel cell 284 between the anode inlet manifold 266 and the active area 285 of each fuel cell 284, and the active area of 285 each fuel cell 284; and a volume B between the end of each active area 285 of each fuel cell 284 adjacent to the anode exhaust manifold 268 and the outlet of the fuel cell system 282 to the anode discharge valve 302, including the anode exhaust manifold 268 and the downstream anode sub-system 300. Knowing the volumes A, B, an amount of hydrogen 290 required to compress any fluid(s) in the fuel cell system 282 into the volume B may be predetermined. Once the gases are compressed into the volume B, the volume A of the fuel cell stack 210 is filled substantially exclusively with hydrogen gas 290.

As shown in FIG. 4, during a filling operation of the fuel cell stack 210, the predetermined amount of gaseous hydrogen 290 is caused to flow from the hydrogen source 297 through the anode inlet conduit 298 and into the means for distributing flow 269 disposed in the anode supply manifold 266, if a means for distributing flow 269, rather than a header purge operation, is used. Fluid pressure caused by the flow of hydrogen 290 into the anode supply manifold 266 and means for distributing flow 269 causes any fluid(s) in the volume A, typically air 296, to flow past the active area 285 of each fuel cell 284 of the fuel cell stack 210 and to be compressed into the volume B as the anode discharge valve 302 is closed during the anode fill. The fluid pressure within the fuel cell stack 210 is increased by continuing to introduce hydrogen through the anode inlet conduit 298 until the predetermined amount of gaseous hydrogen 290 is introduced into the fuel cell system 282 or a predetermined pressure is achieved and the air 296 and/or other fluids are compressed into the volume B. It is understood that a flow rate of the hydrogen 290 flowing into the active areas 285 of the fuel cells 284 may be maximized to minimize a time that a hydrogen-air front is present in the active areas 285 of the fuel cells 284.

As illustrated in FIG. 5, hydrogen is caused to substantially simultaneously and uniformly flow through the active area 285 of each fuel cell 284 at substantially the same flow rate, resulting in an even reactant distribution throughout the fuel cell stack 210 prior to a start-up operation. An even reactant distribution results in a substantially uniform voltage between individual fuel cells 284 of the fuel cell stack 210 allowing current to be drawn from the stack to suppress cell voltages to suppress cathode carbon corrosion and militates against carbon corrosion caused by hydrogen deficits in the fuel cells 284, for example, when current is drawn from the fuel cell stack 210. As hydrogen flows through the active areas 285 of the fuel cells 284, the air 296 is purged from the fuel cells 284 and into the anode exhaust manifold 268 and the anode sub-system 300, but not into the exhaust system 299 as anode discharge valve 302 is closed during this time. It is understood that the flow rate of hydrogen through the active areas 285 of the fuel cells 284 may be maximized in order to minimize the time any hydrogen-air fronts are present in the active area of the fuel cell stack 210.

The present invention minimizes hydrogen emissions during start-up by not using the anode discharge valve 302 during anode flush for startup. The compression of air 296 into the volume B compensates for the not allowing the use of a discharge valve by compressing the air 296 into the volume B away from the active areas 285 of the fuel cells 284. Furthermore, because the fuel cell system 282 does not use anode discharge valves during the anode flush of startup, no hydrogen 290 is required to be purged or otherwise removed therefrom during this time, thereby minimizing an amount of hydrogen 290 required to start the fuel cell system 282 and emissions of the hydrogen 290 from the fuel cell system 282 during startup.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for filling a fuel cell system with a fuel during start-up, the method comprising the steps of:

providing a fuel cell stack having a plurality of fuels cells, each fuel cell having an active area, the fuel cell stack including an anode supply manifold and an anode exhaust manifold, the anode supply manifold in fluid communication with a source of fuel;

providing an anode sub-system in fluid communication with an anode side of the fuel cell stack;

determining the volume between the end of each active area adjacent the anode exhaust manifold and an outlet of the fuel cell system prior to supplying the fuel to the anode supply manifold; and supplying the fuel to the fuel cell stack uniformly across the plurality of fuel cells and simultaneously to the plurality of fuel cells to compress any fluids in the fuel cell stack into a volume between an end of each active area adjacent to the anode exhaust manifold and an outlet of the anode sub-system.

2. The method of claim 1, further comprising the step of determining the volume between the source of fuel and the end of the active area of each fuel cell adjacent the anode exhaust manifold prior to supplying the fuel to the anode supply manifold.

3. The method of claim 2, further comprising the step of determining an amount of fuel from the source of fuel required to compress a fluid in the fuel cell stack into the volume between an end of each active area adjacent the anode exhaust manifold and a volume of the anode sub-system by comparing the volume between the end of each active area adjacent to the anode exhaust manifold and an outlet of the anode sub-system, and the volume between the source of fuel and the end of the active area of each fuel cell adjacent the anode exhaust manifold.

4. A method for filling a fuel cell system with a fuel during start-up, the method comprising the steps of:

providing a fuel cell stack having a plurality of fuels cells, each fuel cell having an active area, the fuel cell stack including an anode supply manifold and an anode exhaust manifold, the anode supply manifold in fluid communication with a source of fuel;

providing an anode sub-system in fluid communication with an anode side of the fuel cell stack;

determining at least one of a time and flow rate and a pressure required to fill the volume between the source of fuel and the end of the active area of each fuel cell adjacent the anode exhaust manifold with the fuel prior to supplying the fuel to the anode supply manifold; and supplying the fuel to the fuel cell stack uniformly across the plurality of fuel cells and simultaneously to the plurality of fuel cells to compress any fluids in the fuel cell stack into a volume between an end of each active area adjacent to the anode exhaust manifold and an outlet of the anode sub-system.

5. A method for filling a fuel cell system with a fuel during start-up, the method comprising the steps of:

providing a fuel cell stack having a plurality of fuels cells, each fuel cell having an active area, the fuel cell stack including an anode supply manifold and an anode exhaust manifold, the anode supply manifold in fluid communication with a source of fuel;

providing an anode sub-system in fluid communication with an anode side of the fuel cell stack; and supplying the fuel to the fuel cell stack uniformly across the plurality of fuel cells and simultaneously to the plurality of fuel cells to compress any fluids in the fuel cell stack into a volume between an end of each active area adjacent to the anode exhaust manifold and an outlet of the anode sub-system, wherein the anode sub-system has a volume from about 0.5× to about 1.5× the combined volume of an anode side of the fuel cell stack and the end of each active area adjacent the anode exhaust manifold and an outlet of the fuel cell system prior to supplying the fuel to the anode supply manifold.

6. A method for filling a fuel cell system with a fuel during start-up, the method comprising the steps of:

providing a fuel cell stack having a plurality of fuels cells, each fuel cell having an active area, the fuel cell stack including an anode supply manifold and an anode exhaust manifold, the anode supply manifold in fluid communication with a source of fuel;

providing an anode sub-system in fluid communication with an anode side of the fuel cell stack;

providing a recycling system in fluid communication with the anode sub-system and the anode supply manifold; and supplying the fuel to the fuel cell stack uniformly across the plurality of fuel cells and simultaneously to the plurality of fuel cells to compress any fluids in the fuel cell stack into a volume between an end of each active area adjacent to the anode exhaust manifold and an outlet of the anode sub-system.

7. A method for filling a fuel cell system with a fuel during start-up, the method comprising the steps of:

providing a fuel cell stack having a plurality of fuels cells, each fuel cell having an active area, the fuel cell stack including an anode supply manifold and an anode exhaust manifold, the anode supply manifold in fluid communication with a source of fuel;

providing an anode sub-system in fluid communication with an anode side of the fuel cell stack;

providing a valve disposed between the anode sub-system and an exhaust system, wherein the valve is in a closed position during a start-up operation; and supplying the fuel to the fuel cell stack uniformly across the plurality of fuel cells and simultaneously to the plurality of fuel cells to compress any fluids in the fuel cell stack into a volume between an end of each active area adjacent to the anode exhaust manifold and an outlet of the anode sub-system.

8. A method for filling a fuel cell system with a fuel during start-up, the method comprising the steps of:

providing a fuel cell stack having a plurality of fuels cells, each fuel cell having an active area, the fuel cell stack including an anode supply manifold and an anode exhaust manifold, the anode supply manifold in fluid communication with a source of fuel;

providing a sub-system in fluid communication with an anode side of the fuel cell stack;

determining the volume between the end of each active area adjacent to the anode exhaust manifold and an outlet of the anode sub-system; and supplying the fuel to the fuel cell stack uniformly across the plurality of fuel cells and simultaneously to the plurality of fuel cells to compress any fluids in the fuel cell stack into a volume between an end of each active area adjacent to the anode exhaust manifold and an outlet of the anode sub-system.

9. The method of claim 7, further comprising the step of determining the volume between the source of fuel and the end of the active area of each fuel cell adjacent the anode exhaust manifold prior to supplying the fuel to the anode supply manifold.

10. The method of claim 8, further comprising the step of determining an amount of fuel from the source of fuel required to compress a fluid in fuel cell stack into a volume between an end of each active area adjacent the anode exhaust manifold and the downstream volume of the anode sub-system, by comparing the volume between the end of each active area adjacent to the anode exhaust manifold and the downstream volume of the anode sub-system, and the volume between the source of fuel and the end of the active area of each fuel cell adjacent to the anode exhaust manifold.

11. The method of claim 9, further comprising the step of determining one of a time and flow rate and a pressure required to fill the volume between the source of fuel and the end of the active area of each fuel cell adjacent the anode exhaust manifold with the fuel prior to supplying fuel to the anode supply manifold.

12. The method of claim 7, wherein the anode sub-system has a volume from about 0.5× to about 1.5× the combined volume of an anode side of the fuel cell stack and the end of each active area adjacent the anode exhaust manifold and an outlet of the fuel cell system prior to supplying the fuel to the anode supply manifold.

13. The method of claim 7, further including the step of providing a recycling system in fluid communication with the anode sub-system and the anode supply manifold.

14. A method for filling a fuel cell system with a fuel during start-up, the method comprising the steps of:

providing a fuel cell stack having a plurality of fuels cells, each fuel cell having an active area, the fuel cell stack including an anode supply manifold and an anode exhaust manifold, the anode supply manifold in fluid communication with a source of fuel;

providing a sub-system in fluid communication with an anode side of the fuel cell stack;

determining the volume between the end of each active area adjacent to the anode exhaust manifold and an outlet of the anode sub-system;

closing an anode discharge valve, the anode discharge valve fluidly coupled to the anode exhaust manifold; and supplying the fuel to the fuel cell stack uniformly across the plurality of fuel cells and simultaneously to the plurality of fuel cells to compress any fluids in the fuel cell stack into a volume between an end of each active area adjacent to the anode exhaust manifold and an outlet of the anode sub-system while the anode discharge valve is closed.

15. The method of claim 13, further comprising the step of determining an amount of fuel from the source of fuel required to compress any fluid in fuel cell stack into a volume between an end of each active area adjacent to the anode exhaust manifold and a downstream volume of the anode sub-system based on the volume between the end of each active area adjacent to the anode exhaust manifold and a downstream volume of the anode sub-system and the volume between the source of fuel and the end of the active area of each fuel cell adjacent to the anode exhaust manifold.

* * * * *